(12) United States Patent
Jung et al.

(10) Patent No.: US 9,907,009 B2
(45) Date of Patent: Feb. 27, 2018

(54) UE IN MOBILE COMMUNICATION SYSTEM AND METHOD OF CONTROLLING SAME

(71) Applicants: Hyeun-Mok Jung, Gyeonggi-do (KR);
Praveen Chebolu, Gyeonggi-do (KR);
Kedar Santosh Kumar Aalla,
Bangalore (IN); Jai-Dong Kim,
Gyeonggi-do (KR)

(72) Inventors: Hyeun-Mok Jung, Gyeonggi-do (KR);
Praveen Chebolu, Gyeonggi-do (KR);
Kedar Santosh Kumar Aalla,
Bangalore (IN); Jai-Dong Kim,
Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 146 days.

(21) Appl. No.: 15/093,887

(22) Filed: Apr. 8, 2016

(65) Prior Publication Data
US 2017/0048781 A1 Feb. 16, 2017

(30) Foreign Application Priority Data

Aug. 11, 2015 (KR) .................. 10-2015-0112904

(51) Int. Cl.
*H04W 36/38* (2009.01)
*H04W 36/00* (2009.01)
*H04L 29/06* (2006.01)
*H04W 80/10* (2009.01)

(52) U.S. Cl.
CPC .......... *H04W 36/38* (2013.01); *H04L 65/608* (2013.01); *H04W 36/0022* (2013.01); *H04W 80/10* (2013.01)

(58) Field of Classification Search
CPC .. H04W 36/38; H04W 36/0022; H04L 65/608
See application file for complete search history.

(56) References Cited

U.S. PATENT DOCUMENTS

| | | | |
|---|---|---|---|
| 2003/0133421 A1* | 7/2003 | Sundar .................... | H04W 4/00 370/328 |
| 2011/0103277 A1* | 5/2011 | Watfa ................ | H04W 36/0022 370/310 |
| 2012/0127960 A1* | 5/2012 | Lei .................... | H04W 36/0022 370/332 |
| 2013/0195075 A1 | 8/2013 | Keller et al. | |
| 2014/0064156 A1 | 3/2014 | Paladugu et al. | |
| 2014/0286308 A1* | 9/2014 | Lee .................... | H04W 36/0022 370/331 |
| 2015/0009960 A1 | 1/2015 | Surface et al. | |
| 2015/0078337 A1* | 3/2015 | Kim .................... | H04L 65/1083 370/331 |
| 2015/0334588 A1* | 11/2015 | Cui ........................ | H04W 36/26 370/252 |

* cited by examiner

*Primary Examiner* — Ronald B Abelson
(74) *Attorney, Agent, or Firm* — The Farrell Law Firm, P.C.

(57) ABSTRACT

A method of controlling a User Equipment (UE) in a mobile communication system and a communication device in the UE are provided. The method including determining whether a first waiting time related to a call interruption event in a first call mode is exceeded; if the first waiting time is exceeded, transmitting a Session Initiation Protocol information (SIP INFO) message for switching the first call mode to a second call mode to an external device; and switching a call mode of the UE to the second call mode based on a response message in response to the SIP INFO message.

18 Claims, 6 Drawing Sheets

UE IN MOBILE COMMUNICATION SYSTEM AND METHOD OF CONTROLLING SAME

PRIORITY

This application claims priority under 35 U.S.C. § 119(a) to a Korean Patent Application Serial No. filed on Aug. 11, 2015 in the Korean Intellectual Property Office and assigned Serial No. 10-2015-0112904, the entire content of which is incorporated herein by reference.

BACKGROUND

1. Field of the Disclosure

The present disclosure relates generally to a user equipment (UE) in a mobile communication system and a method of controlling the same and, more particularly, to a UE capable of maintaining continuity of a voice call in a mobile communication system and a method of controlling the same.

2. Description of the Related Art

A UE may receive various network services such as Voice over Long Term Evolution (LTE) (VoLTE) from a mobile communication system like 3rd Generation Partnership (3GPP) or LTE.

SUMMARY

An aspect of the present disclosure provides a UE which may maintain continuity of a voice call through a HandOver (HO) of a call mode of a UE to a Circuit Switched (CS) call even though a VoLTE call is due to be released and the call interrupt event is generated regardless of a user's intention.

Another aspect of the present disclosure provides a method of controlling a UE, which may maintain continuity of a voice call through a HO of a call mode of a UE to a CS call even though a VoLTE call is due to be released regardless of a user's intention and a call interrupt event is generated.

Another aspect of the present disclosure provides that if a VoLTE call is due to be released regardless of a user's intention, continuity of the voice call can be maintained through an HO of the call mode of a UE to a CS call even though a call interruption event is generated.

In accordance with an aspect of the present disclosure, a method of controlling a UE is provided. The method includes determining whether a first waiting time related to a call interruption event in a first call mode is exceeded; if the first waiting time is exceeded, transmitting an Session Initiation Protocol information (SIP INFO) message for switching the first call mode to a second call mode to an external device; and switching a call mode of the UE to the second call mode based on a response from the external device to the SIP INFO message.

In accordance with another aspect of the present disclosure, a communication device in a UE of a mobile communication system is provided. The communication device includes a transceiver configured to communicate with an external device; a memory electrically connected to the transceiver and configured to store information for performing communication; and a processor electrically connected to the transceiver and the memory, wherein the processor is configured to determine whether a first waiting time related to a call interruption event in a first call mode is exceeded, transmit a SIP INFO message for switching the first call mode to a second call mode to an external device if the first waiting time is exceeded, and switch a call mode of the UE to the second call mode based on a response received from the external device to the SIP INFO message.

In accordance with another aspect of the present disclosure, a method of controlling a UE is provided. The method includes determining whether a call interruption event is generated in a first call mode; if the call interruption event is generated, transmitting an Extended Service Request (ESR) message for a handover from the first call mode to a second call mode to an external device; and switching a call mode of the UE to the second call mode based on a response from the external device to the ESR message.

In accordance with another aspect of the present disclosure, a chipset for controlling a UE in a mobile communication system is provided. The chipset is configured to determine whether a first waiting time related to a call interruption event in a first call mode is exceeded; transmit, if the first waiting time is exceeded, a SIP INFO message for switching the first call mode to a second call mode to an external device; and switch a call mode of the UE to the second call mode based on a response from the external device to the SIP INFO message.

In accordance with another aspect of the present disclosure, a chipset for controlling a UE in a mobile communication system is provided. The chipset is configured to determine whether a call interruption event is generated in a first call mode; transmit, if the call interruption event is generated, an ESR message for a handover from the first call mode to a second call mode to an external device; and switch a call mode of the UE to the second call mode based on a response from the external device to the ESR message.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
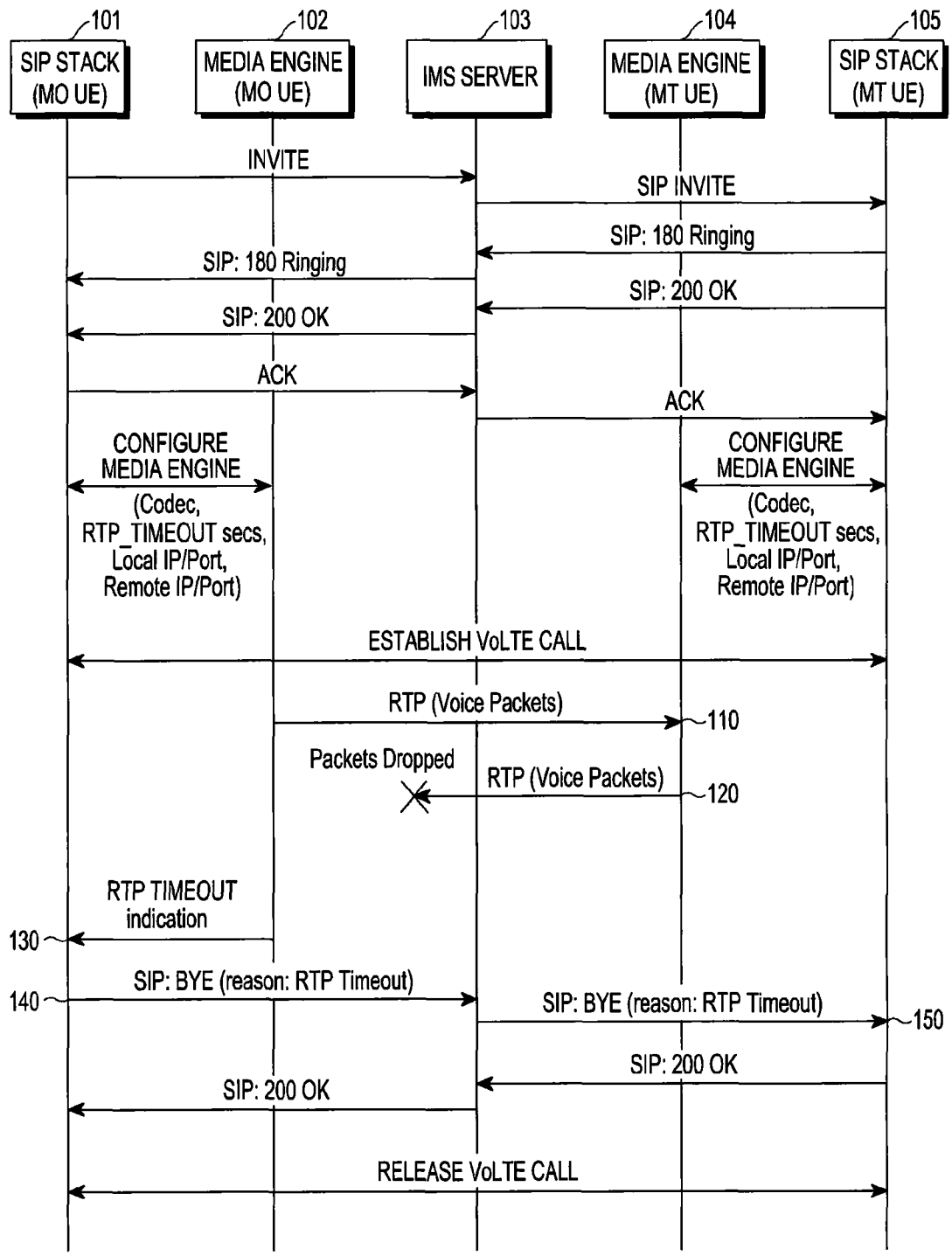
FIGS. 1 and 2 are flow diagrams for a case where a VoLTE service is released while the VoLTE service is provided through a UE.

Hereinafter, various embodiments of the present disclosure are described with reference to the accompanying drawings. However, it should be understood that there is no intent to limit the present disclosure to the particular forms disclosed herein; rather, it is intended that the present disclosure should be construed to cover various modifications, equivalents, and/or alternatives of the present disclosure. In describing the accompanying drawings, similar reference numerals may be used to designate similar elements.

As used herein, the terms "have," "may have," "include," or "may include," refer to the existence of a corresponding feature (e.g., a numeral, a function, an operation, or an element such as a component), and do not exclude one or more additional features.

In the present disclosure, the terms "A or B," "at least one of A or/and B," or "one or more of A or/and B" may include all possible combinations of the items listed. For example, the expressions "A or B," "at least one of A and B," or "at least one of A or B" refer to all of (1) including at least one A, (2) including at least one B, and (3) including all of at least one A and at least one B.

The terms "a first," "a second," "the first," or "the second" used in an embodiment of the present disclosure may modify various components regardless of the order and/or the importance, but does not limit the corresponding components. For example, a first user device and a second user device indicate different user devices although both of them are user devices. For example, a first element may be referred to as a second element, and similarly, a second element may be referred to as a first element without departing from the scope and spirit of the present disclosure.

It should be understood that if an element (e.g., a first element) is referred to as being (operatively or communicatively) "connected," or "coupled," to another element (e.g., a second element), it may be directly connected or directly coupled to the other element or any other element (e.g., a third element) may be interposed between them. In contrast, it may be understood that if an element (e.g., a first element) is referred to as being "directly connected," or "directly coupled" to another element (e.g. a second element), there is no element (e.g., a third element) interposed between them.

The term "configured to" used in the present disclosure may be used interchangeably with, for example, "suitable for," "having the capacity to," "designed to," "adapted to," "made to," or "capable of" according to the situation. The term "configured to" may not necessarily imply "specifically designed to" in hardware. Alternatively, in some situations, the term "device configured to" may indicate that a device, together with other devices or components, "is able to." For example, the phrase "processor adapted (or configured) to perform A, B, and C" may indicate a dedicated processor (e.g. an embedded processor) only for performing the corresponding operations or a general-purpose processor (e.g., a Central Processing Unit (CPU) or an Application Processor (AP)) that may perform the corresponding operations by executing one or more software programs stored in a memory device.

The terms used herein are merely for the purpose of describing particular embodiments of the present disclosure and are not intended to limit the scope of other embodiments. As used herein, singular forms may include plural forms as well unless the context clearly indicates otherwise. Unless defined otherwise, all terms used herein, have the same meanings as those commonly understood by a person skilled in the art to which the present disclosure pertains. Terms such as those defined in a generally used dictionary may be interpreted to have the same meanings as the contextual meanings in the related art, and are not to be interpreted to have ideal or excessively formal meanings unless clearly defined in the present disclosure. In some cases, even a term defined in the present disclosure should not be interpreted to exclude embodiments of the present disclosure.

According to an embodiment of the present disclosure, the term "communication device" may refer to, for example, a unit including one of hardware, software, firmware, or a combination of at least two thereof. The term "communication device" may be interchangeably used with various terms such as "communication unit," "communication logic," "communication logical block," "communication component," and "communication circuit." For example, a communication device may be referred to as a modem or a modem integrated circuit or chip in some embodiments. In the present disclosure, the term "communication device" may indicate at least one element (for example, a transceiver 301, a processor 302, and/or a memory 303 in FIG. 3A described below) included in the communication device. A communication device may be the smallest unit of an integrated element or a part thereof. A communication device may be the smallest unit that performs one or more functions or a part thereof. A communication device may be mechanically or electronically implemented. For example, a communication device may include at least one of an Application-Specific Integrated Circuit (ASIC), a Field-Programmable Gate Array (FPGA), and a programmable-logic device for performing operations which are known or will be developed in the future.

A communication device (e.g. the communication device 300 of FIG. 3A described below) according to an embodiment of the present disclosure may operate while being included (in other words, "disposed" or "comprised") in a UE (e.g. a UE 310 in FIG. 3B described below). An electronic device according to the present disclosure may include at least one of, for example, a smartphone, a tablet Personal Computer (PC), a mobile phone, a video phone, an electronic book reader (e.g. an e-book reader), a desktop PC, a laptop PC, a netbook computer, a workstation, a server, a Personal Digital Assistant (PDA), a Portable Multimedia Player (PMP), a Moving Picture Experts Group (MPEG-1) audio layer-3 (MP3) player, a mobile medical device, a camera, and a wearable device. The wearable device may include at least one of an accessory type (e.g., a watch, a ring, a bracelet, an anklet, a necklace, glasses, a contact lens, or a Head-Mounted Device (HMD)), a fabric or clothing integrated type (e.g., electronic clothing), a body-mounted type (e.g., a skin pad or tattoo), and a bio-implantable type (e.g., an implantable circuit).

Hereinafter, a communication device and a user terminal according to an embodiment of the present disclosure are described with reference to the accompanying drawings. In the present disclosure, the term "user" may refer to a person using a communication device, an apparatus using a communication device (for example, an artificial intelligence device), a person using a user terminal, or a device using a terminal.

Figure 2:
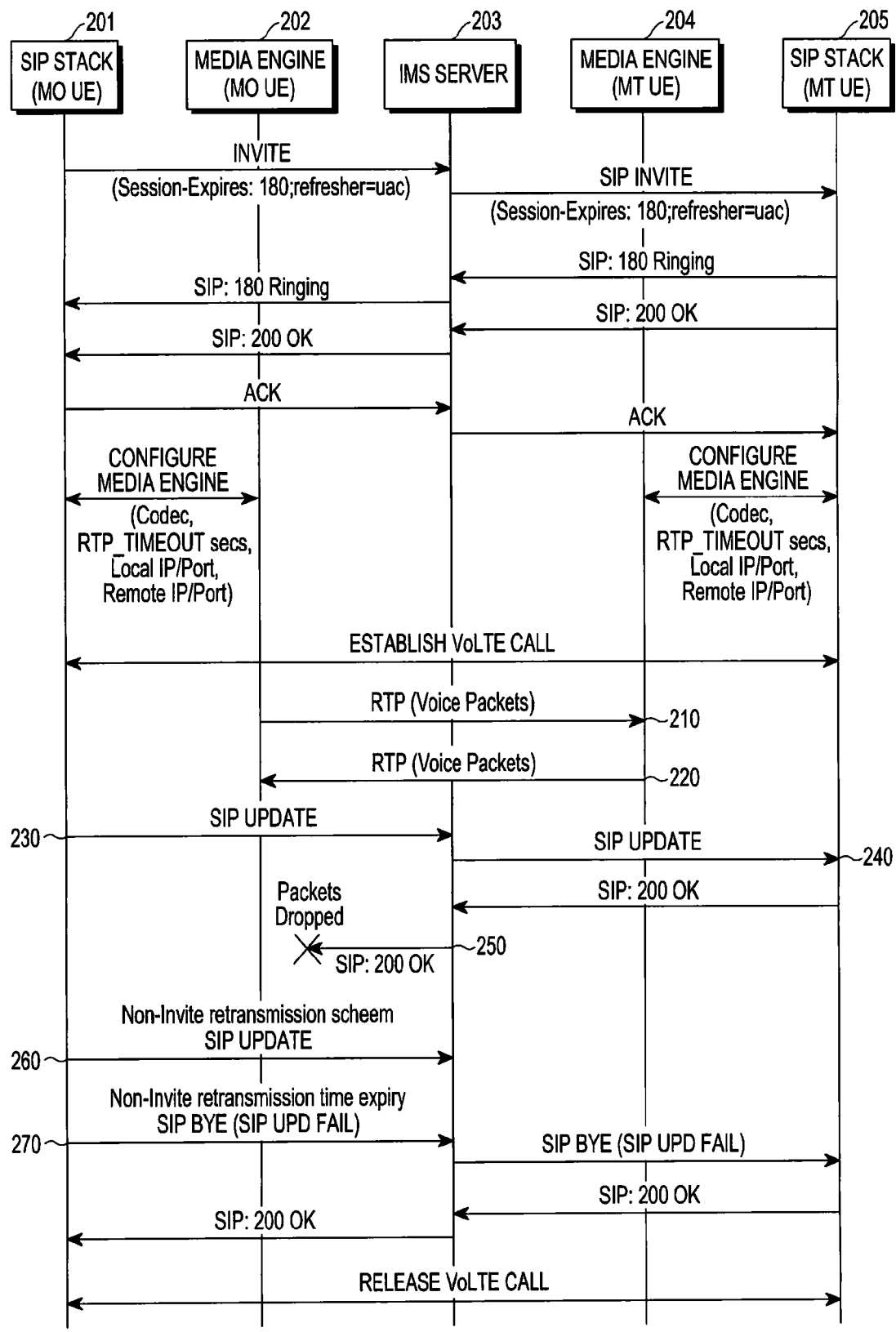

FIGS. 1 and 2 are flow diagrams for describing a case where a VoLTE service is released while the VoLTE service is provided through the UE. More specifically, FIG. 1 illustrates a case where a VoLTE service is released due to the generation of a call interruption event such as Real-time Transport Protocol (RTP) timeout. FIG. 2 illustrates a case where a VoLTE service is released due to the generation of a call interruption event such as a session update failure (in other words, a session refresh failure).

Referring to FIG. 1, after a session for a VoLTE call is established between Mobile Originators (MOs) (e.g., a SIP stack 101 and a media engine 102) and Mobile Terminators (MTs) (e.g., a media engine 104 and an SIP stack 105), the MO 102 may transmit voice packets to the MT 104 in step 110. However, the MO 102 may not receive voice packets from the MT 104 as illustrated in step 120 in FIG. 1. If a response is not received from the MT 104 for at least a predetermined waiting time, the MO 102 may transmit a message (for example, an RTP timeout indication), which indicates RTP timeout, to the SIP stack 101 in step 130. Accordingly, an MO (for example, the SIP stack 101) may transmit a BYE message to an Internet Protocol Multimedia Subsystem (IMS) server 103 due to the RTP timeout, and the IMS server 103 may transmit a BYE message to an MT (for example, the SIP stack 105). Accordingly, the VoLTE call may be released.

Referring to FIG. 2, after a session for the VoLTE call is established between the MOs (e.g., the SIP stack 201 and the media engine 202) and the MTs (e.g., the media engine 204 and the SIP stack 205), voice packets may be transmitted and received between an MO (for example, the media engine 202) and the MT (for example, the media engine 204) unlike in FIG. 1. However, as illustrated in FIG. 2, a response 250 according to SIP update (referred to as "session update") requests 230 and 240 of an MO may not be received from the IMS server 203. If the response is not received for a predetermined waiting time, an MO (for example, the SIP stack 201) may transmit a BYE message to the IMS server 203 due to the failure of the session update in step 270, and the IMS server 203 may transmit the BYE message to an MT (for example, the SIP stack 205) in step 280. Accordingly, the VoLTE call may be released.

If the RTP timeout or the session update failure event is generated, the VoLTE call provided to a user through a UE may be released. A release of a VoLTE call may not be intended by a user and, accordingly, may inconvenience the user. That is, if a VoLTE call is due to be released according to a generation of a call interruption event regardless of a user's intention, continuity of a voice call may not be maintained.

Figure 3A:
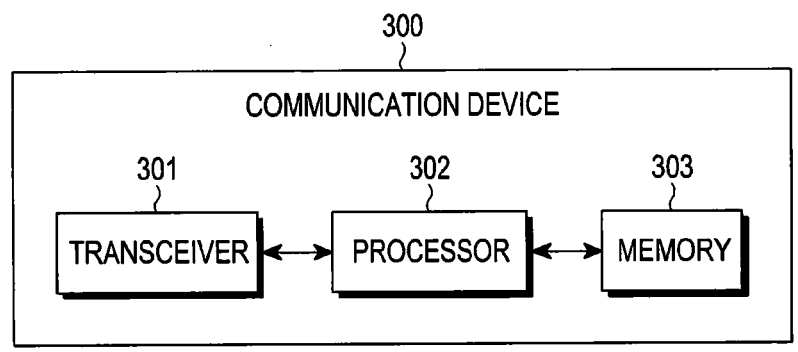
FIG. 3A is a block diagram of a communication device according to various embodiments of the present disclosure.

FIG. 3A is a block diagram of a communication device according to an embodiment of the present disclosure.

Referring to FIG. 3A, the communication device 300 may include at least one of the transceiver 301, the processor 302, and the memory 303.

The transceiver 301 may establish communication between, for example, the communication device 300 and an external device (for example, a first external electronic device 330, a second external electronic device 340, or a server 350 of FIG. 3B described below). For example, the transceiver 310 may be connected to a network 320 of FIG. 3B described below through wireless communication or wired communication, so as to communicate with an external device. The term "transceiver" is interchangeable with "communication interface."

A wireless communication may use at least one of, for example, LTE, LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM) as a cellular communication protocol. Further, a wireless communication may include, for example, short-range communication. A short-range communication may include at least one of, for example, Wireless Fidelity (Wi-Fi), Bluetooth, Near Field Communication (NFC), and a Global Navigation Satellite System (GNSS). A GNSS may include at least one of, for example, a Global Positioning System (GPS), a Global Navigation Satellite System (Glonass), a Beidou Navigation Satellite System (Beidou), and a European Global Satellite-based Navigation System (Galileo) according to an area of use, a bandwidth, or the like. The term "GPS" may be used interchangeably with "GNSS." A wired communication may include at least one of, for example, a Universal Serial Bus (USB), a High Definition Multimedia Interface (HDMI), Recommended Standard 232 (RS-232), and a Plain Old Telephone Service (POTS). The network 320 of FIG. 3B described below may include at least one communication network such as a computer network (for example, a Local Area Network (LAN) or a Wide Area Network (WAN)), the Internet, and a telephone network.

The processor 302 may include a Communication Processor (CP). The processor 302 may include one or more of a CPU and an AP. The processor 302 may, for example, execute operations or process data related to the control and/or communication of at least one other element of the communication device 300. The term "processor" is interchangeable with various terms such as a "control module," "control unit," and "controller."

The memory 303 may include a volatile memory and/or a non-volatile memory. The memory 303 may store, for example, instructions or data related to at least one other component of the communication device 300. The memory 303 may store software and/or a program. The program may include, for example, a kernel, middleware, an Application Programming Interface (API), and/or an application program (or "application"). Although FIG. 3A illustrates that the memory 303 is included in the communication device 300, this is only an example for describing the present disclosure. The memory 303 may be omitted in a process of manufacturing the communication device 300.

Figure 3B:
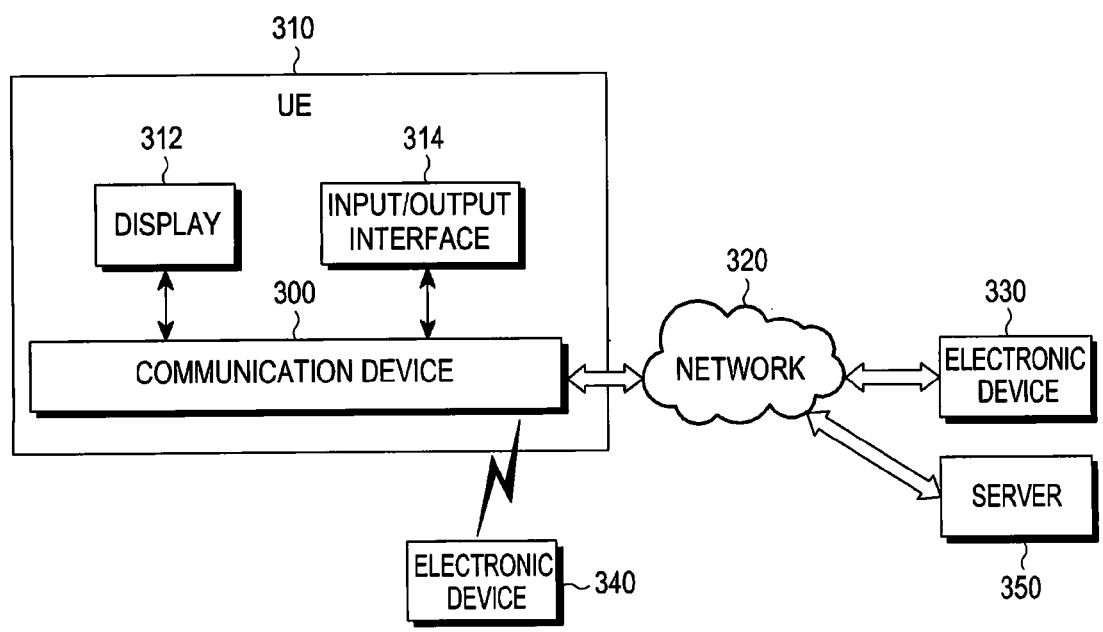
FIG. 3B is a block diagram of a UE including a communication device according to an embodiment of the present disclosure.

FIG. 3B is a block diagram of the UE 310 including the communication device 300 according to an embodiment of the present disclosure.

Referring to FIG. 3B, the UE 310 may include the communication device 300, a display 312, and an input/output interface 314.

The display 312 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 312 may display, for example, various types of contents (for example, text, images, videos, icons, or symbols) to a user. The display 312 may include a touch screen and receive, for example, a touch input, a gesture input, a proximity input, or a hovering input using an electronic pen or a part of a user's body.

The input/output interface 314 may serve as an interface that may transfer instructions or data, which are input from a user or an external device, to another element(s) of the communication device 300. Further, the input/output interface 314 may output instructions or data received from another element(s) of the UE 310 to a user or an external device.

The UE 310 may further include a storage module (for example, a memory) or a processor.

Figure 4:
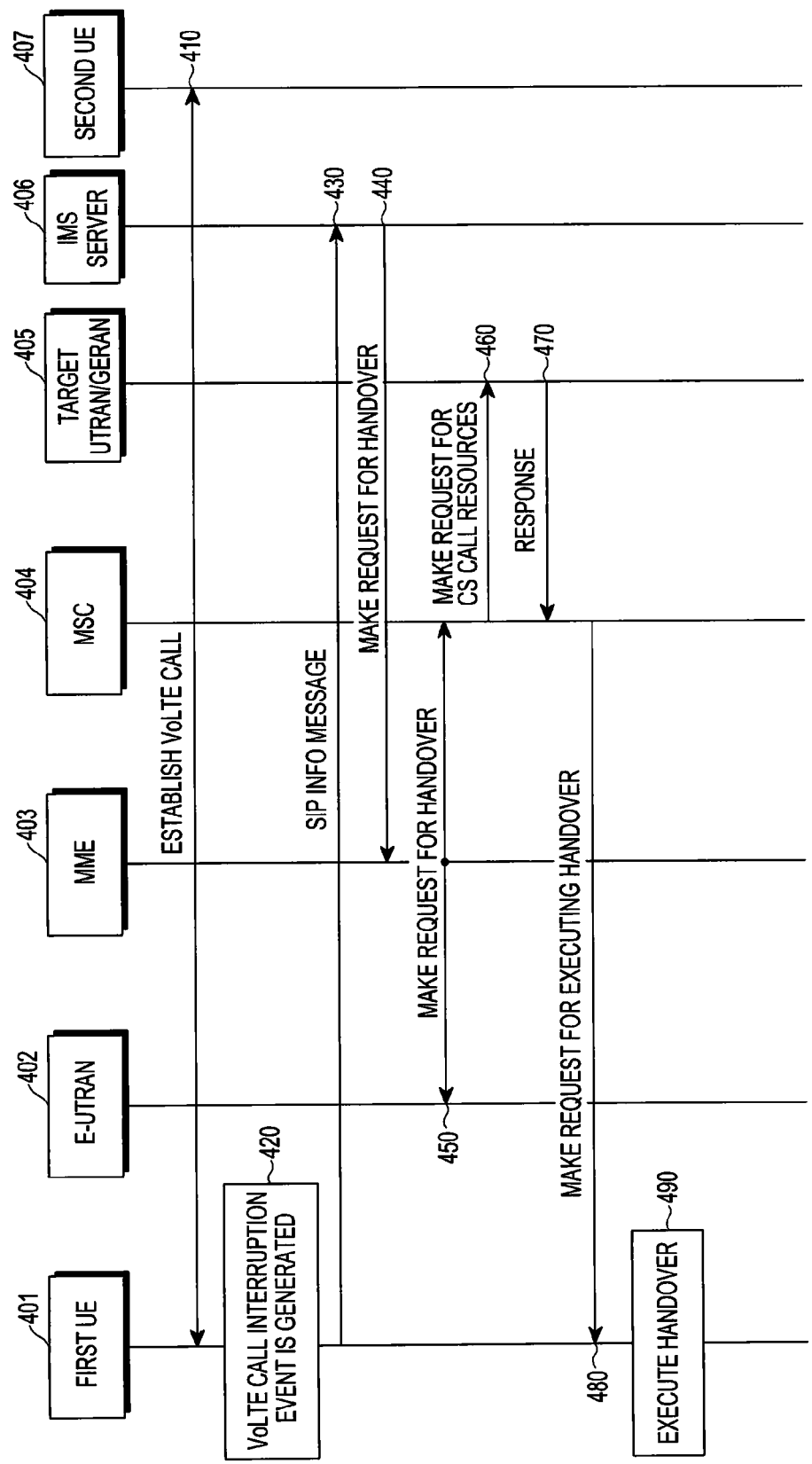
FIG. 4 is a flow diagram in which a UE performs a handover to a CS call if a VoLTE call interruption event is due to be generated according to an embodiment of the present disclosure.

FIG. 4 is a flow diagram in which a UE (for example, a first UE 401) performs a handover to a CS call if a VoLTE call interruption event is due to be generated according to an embodiment of the present disclosure. FIG. 4 illustrates an example of a case where the generation of an RTP timeout is expected as the VoLTE call interruption event. The function/functions or the operation/operations in which a UE performs a handover to a CS call may be controlled by a communication device (for example, the communication device 300 of FIG. 3A) included in the UE.

Referring to FIG. 4, a session for a VoLTE call may be established between the first UE 401 and a second UE 407 in step 410. A memory of the first UE 401 (for example, the memory 303 of FIG. 3A, a memory included in the first UE 401, or a memory included in the second UE 407, which are separated from the communication device 300) may store information on a time at which an RTP timeout is generated (referred to as a "second waiting time"). The second waiting time may be at least 10 seconds (10 secs is general RTP Timeout Value which can be changed from operator to operator environment) after a voice packet is last received from the second UE 407. Alternatively, if a voice packet is not received from the second UE 407 after a session for a VoLTE call is established in step 410, the second waiting time may be at least 10 seconds after the session for the VoLTE call is established in step 410. A session where a VoLTE call is configured may be referred to as connecting a VoLTE call. The memory of the first UE 401 may store information on a waiting time (referred to as a "first waiting time") at which the generation of an RTP timeout is expected. The first waiting time may be 7 seconds after a voice packet is last received from the second UE 407 or 7 seconds after the VoLTE call session is established in step 410, but the present disclosure is not limited thereto.

During a VoLTE call in a VoLTE call session, voice packets from the second UE 407 or an IMS server 406 may not be transmitted to the first UE 401. The communication device (for example, the communication device 300 in FIG. 3A) of the first UE 401 may determine whether an RTP timeout is generated based on whether the first waiting time is exceeded in step 420 (e.g. a VoLTE call interruption event is due to be generated). In other words, if the first waiting time is exceeded, the communication device of the first UE 401 may expect the generation of an RTP timeout. If the first waiting time is exceeded, the communication device of the first UE 401 may control the first UE 401 to transmit an SIP information (SIP INFO) message to the IMS server 406 in step 430 before the second waiting time is exceeded. The SIP INFO message may include, for example, elements of Table 1 below.

TABLE 1

<?xml version="1.0" encoding="UTF-8"?>
<volte_control>
<ue_condition>
<cause=" RTP Timeout"\>
</ ue_condition >
</volte_control>

In Table 1 above, "<cause=" RTP Timeout"/>" may be an element, which informs the IMS server 406 that a VoLTE call (in other words, a VoLTE session) is due to be released according to the generation of a call interruption event such as an RTP timeout.

The IMS server 406 may request a handover of the first UE 401 to a Mobility Management Entity (MME) 403 in step 440 in response to the reception of a SIP INFO message. The MME 403, that receives a request for a handover may make a request for the handover to an Evolved Universal Terrestrial Radio Access Network (E-UTRAN) 402 and a Mobile Switching Center (MSC) 404 in step 450. The MSC 404 that receives a request for a handover may make a request for CS call resources for the handover to a target Universal Terrestrial Radio Access Network (UTRAN) (or a target GSM Enhanced Data for Global Evolution (EDGE) Radio Access Network (GERAN)) 405 of the handover in step 460. If the MSC 404 receives a response to the request for CS call resources (in other words, if resources required for the handover are secured) in step 470, the MSC 404 may make a request for executing the handover of the first UE 401 in step 480. The first UE 401 that receives a request for executing a handover may execute the handover from a Packet Switched (PS) call to a CS call in step 490. That is, the SIP INFO message may refer to a message for initiating a Single Radio Voice Call Continuity (SRVCC) procedure or a CS fallback procedure. Step 490 may be controlled by, for example, the communication device of the first UE 401.

According to the flow diagram in FIG. 4, the UE 401 may expect the VoLTE call to be released or terminated and perform a handover to a CS call, so as to maintain the continuity of a voice call.

The flow diagram of FIG. 4 may be applied to a case where a failure of a session update is expected. In this case, the first waiting time may refer to a predetermined time after the first UE 401 makes a last request for a session update to the IMS server 406 (for example, 7 seconds after the IMS server 406 receives a last request for a session update). Further, the second waiting time may refer to a time at which it is determined that the session update fails (for example, 10 seconds after the IMS server 406 receives a last request for a session update). In addition, an SIP INFO message may include, for example, elements of Table 2 below.

TABLE 2

<?xml version="1.0" encoding="UTF-8"?>
<volte_control>
<ue_condition>
<cause="SIP Update Failed"\>
</ue_condition >
</volte_control>

In Table 2 above, "<cause="SIP Update Failed"\>" may be an element, which informs the IMS server 406 that a VoLTE call (in other words, a VoLTE session) is due to be released or terminated according to the generation of a call interruption event such as a failure of a session update.

The phrase "before a second waiting time is exceeded" is interchangeable with the phrase "before a SIP stack receives an RTP timeout indication" (for example, step 130 of FIG. 1).

Figure 5:
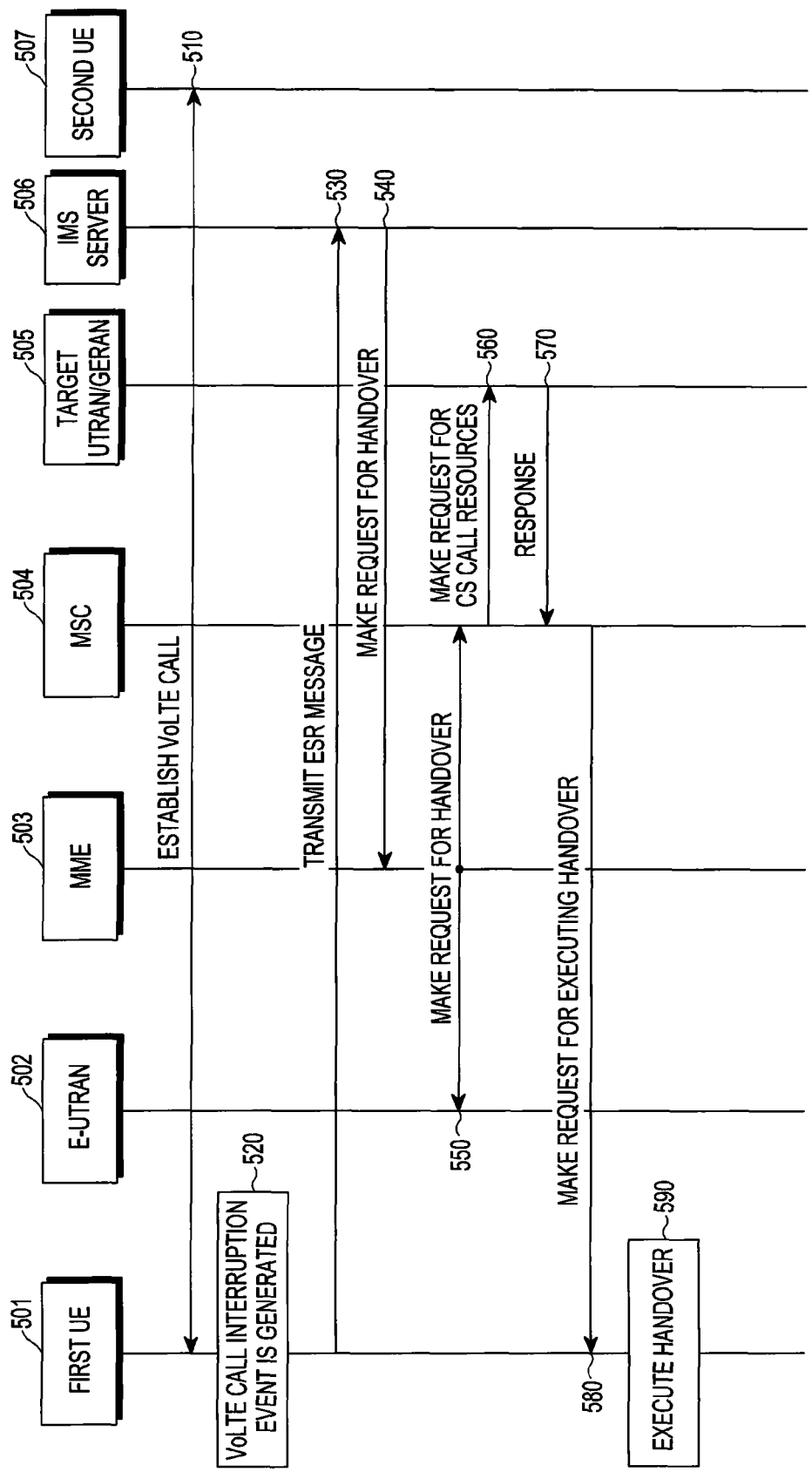
FIG. 5 is a flow diagram in which a UE performs a handover to a CS call if a VoLTE call interruption event is generated according to an embodiment of the present disclosure.

FIG. 5 is a flow diagram in which a UE (for example, a first UE 501) performs a handover to a CS call if a VoLTE call interruption event is generated according to an embodiment of the present disclosure. FIG. 5 illustrates an example of a case where a session update fails due to a VoLTE call interruption event. The function/functions or the operation/operations in which a UE performs a handover to a CS call may be controlled by a communication device (for example, the communication device 300 of FIG. 3A) included in the UE.

Referring to FIG. 5, a session for a VoLTE call may be established between the first UE 501 and a second UE 507 in step 510. After a VoLTE session is established, the communication device of the first UE 501 may determine whether a waiting time for a session update is exceeded in step 520 (e.g. a VoLTE call interruption event is generated). If it is determined that a waiting time is exceeded, the communication device of the UE 501 may control the first UE 501 to transmit an ESR message to an IMS server 506 in step 530. The ESR message may include, for example, code of Table 3 below.

TABLE 3

Service type value (octet 1)

| Bits 4 3 2 1 | |
|---|---|
| 0 0 0 0 | mobile originating CS fallback or 1xCS fallback |
| 0 0 0 1 | mobile terminating CS fallback or 1xCS fallback |
| 0 0 1 0 | mobile originating CS fallback emergency call |
| 0 0 1 1 | unused; shall be interpreted as "mobile originating CS fallback" |
| 0 1 0 0 | unused; shall be interpreted as "mobile originating CS fallback" |
| 1 0 0 0 | packet services via S1 |
| 1 0 0 1 | unused; shall be interpreted as "packet services via S1," if received by the network |
| 1 0 1 0 | unused; shall be interpreted as "packet services via S1," if received by the network |
| 1 0 1 1 | unused; shall be interpreted as "packet services via S1," if received by the network |
| 1 1 0 0 | PS to CS HO Request via S1(SRVCC) |

All other values are reserved.

In Table 3 above, "1 1 0 0 PS to CS HO Request via S1 (SRVCC)" may be an element for making a request for a handover to a CS call to the IMS server 506 (e.g. an element for initiating an SRVCC procedure).

The IMS server 506 may make a request for a handover of the first UE 501 to an MME 503 in step 540 in response to the reception of an ESR message. The MME 503 that receives a request for a handover may make a request for the handover to an E-UTRAN 502 and an MSC 504 in step 550. The MSC 504 that receives a request for a handover may make a request for CS call resources for the handover to a target UTRAN (or a target GERAN) 505 of the handover in step 560. If the MSC 504 receives a response to the request for a handover (in other words, if resources required for the handover are secured) in step 570, the MSC 504 may make a request for executing the handover of the first UE 501 in step 580. The first UE 501 that receives a request for a handover may execute the handover from a PS call to a CS call in step 590. That is, the SIP INFO message may refer to a message for initiating the SRVCC procedure or the CS fallback procedure. Step 590 may be controlled by, for example, the communication device of the first UE 501.

The flow diagram of FIG. 5 may be applied to a case where an RTP timeout is generated as described above. In this case, the first UE 501 may determine whether a waiting time for an RTP timeout is exceeded in step 520.

The electronic devices except for UEs (for example, the first UEs 401 and 501 and the second UEs 407 and 507) may be collectively referred to as an external device.

Various functions or operations performed by a UE (for example, the first UE 401 and/or the first UE 501) may be controlled by an AP included in the UE separately from the communication device 300 according to the control of the communication device 300. That is, the various functions or operations performed by a UE may be controlled by the processor 301 and the AP cooperating with each other or by the AP itself.

Figure 6:
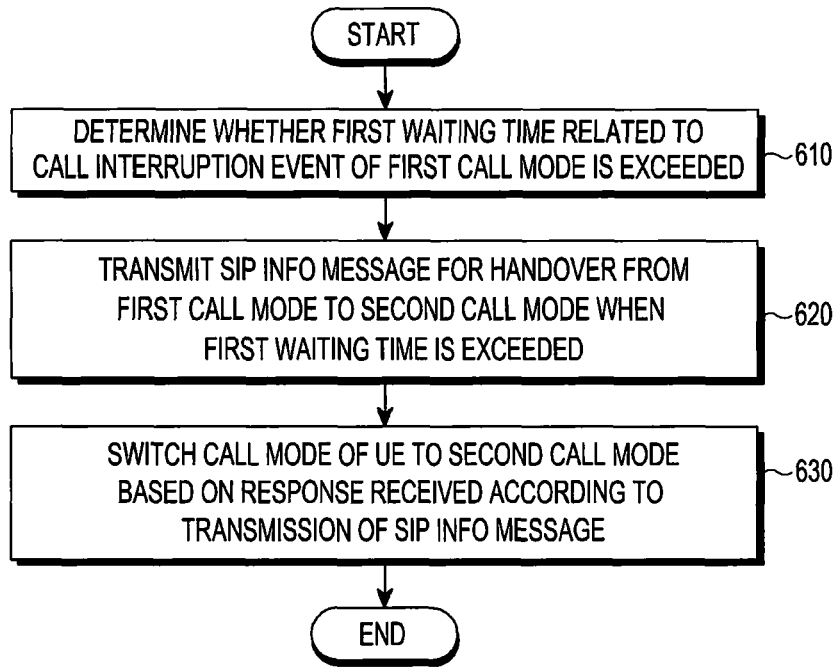
FIG. 6 is a flow chart of a method of a UE if a VoLTE call interruption event is due to be generated according to an embodiment of the present disclosure.

FIG. 6 is a flowchart of a method of a UE if the VoLTE call interruption event is generated according to an embodiment of the present disclosure.

Referring to FIG. 6, a control method of a UE (for example, the first UE 401) may include step 610 of determining whether a first waiting time related to a call interruption event of a first call mode is exceeded.

The method of the UE may include step 620 of transmitting an SIP INFO message for a handover from the first call mode to a second call mode if the first waiting time is exceeded.

The method of the UE may include step 630 of switching the call mode of the UE to the second call mode based on a response to the SIP INFO message.

In addition, the method of the UE may be applied to the UE of FIG. 4.

Figure 7:
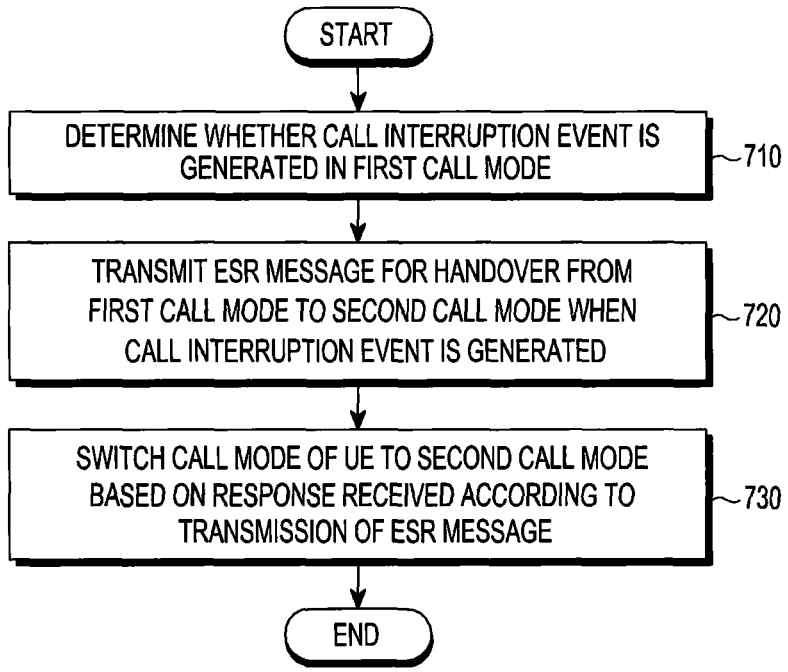
FIG. 7 is a flowchart of a method of a UE if a VoLTE call interruption event is generated according to an embodiment of the present disclosure.

FIG. 7 is a flowchart of a method of a UE if a VoLTE call interruption event is generated according to an embodiment of the present disclosure.

Referring to FIG. 7, the method of the UE may include step 710 of determining whether a call interruption event is generated in a first call mode.

The control method of the UE may include step 720 of transmitting an ESR message for a handover from the first call mode to a second call mode if the call interruption event is generated.

The control method of the UE may include step 730 of switching the call mode of the UE to the second call mode based on a response to the ESR message.

In addition, the method of the UE may be applied to the UE of FIG. 5.

At least some of the UE and/or the communication device (or operation/operations or function/functions performed by the UE and/or the communication device) or the method according to an embodiment of the present disclosure may be implemented by instructions stored in a non-transitory computer-readable storage medium in, for example, a program module form. An instruction, if executed by a processor (e.g., the processor 302), may cause one or more processors to execute a function corresponding to the instruction. The non-transitory computer-readable storage medium may be, for example, the memory 303.

The non-transitory computer readable storage medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the instructions may include high level language code, which may be executed in a computer by using an interpreter, as well as machine code generated by a compiler. The aforementioned hardware device may be configured to operate as one or more software modules in order to perform the operation of the present disclosure, and vice versa.

A chipset for controlling a UE in a mobile communication system is provided. The chipset is configured to determine whether a first waiting time related to a call interruption event in a first call mode is exceeded; transmit, if the first waiting time is exceeded, a SIP INFO message for switching the first call mode to a second call mode to an external device; and switch a call mode of the UE to the second call mode based on a response from the external device to the SIP INFO message.

Alternatively, the chipset may be configured to determine whether a call interruption event is generated in a first call mode; transmit, if the call interruption event is generated, an ESR message for a handover from the first call mode to a second call mode to an external device; and switch a call mode of the UE to the second call mode based on a response from the external device to the ESR message.

A communication device according to an embodiment of the present disclosure, a UE including a communication device, and a method thereof or a program module may include at least one of the above described elements, omit some of the elements, or further include other elements. Operations executed by a module, a programming module, or other component elements according to an embodiment of the present disclosure may be executed sequentially, in parallel, repeatedly, or in a heuristic manner. Further, some operations may be executed according to another order or may be omitted, or other operations may be added. Various embodiments disclosed herein are provided merely to describe the present disclosure and to facilitate understanding of the present disclosure, but are not intended to limit the scope of the present disclosure. Therefore, it is intended that all modifications and changes or modified and changed forms based on the present disclosure fall within the scope of the present disclosure as defined in the appended claims and their equivalents.

What is claimed is:

1. A method of controlling a User Equipment (UE) in a mobile communication system, the method comprising:
    determining whether a first waiting time related to a call interruption event in a first call mode is exceeded;
    if the first waiting time is exceeded, transmitting a Session Initiation Protocol information (SIP INFO) message for switching the first call mode to a second call mode to an external device; and
    switching a call mode of the UE to the second call mode based on a response message in response to the SIP INFO message,
    wherein the SIP INFO message is transmitted to the external device before a second waiting time related to the call interruption event is exceeded.

2. The method of claim 1, wherein the first waiting time is less than the second waiting time if a session for the first call mode is established.

3. The method of claim 1, wherein the first call mode is released if the first waiting time is exceeded.

4. The method of claim 1, wherein the first call mode includes a Packet Switched (PS) call, and the second call mode includes a Circuit Switched (CS) call.

5. The method of claim 4, wherein switching the call mode of the UE to the second call mode comprises switching the call mode of the UE to the CS call according to Single Radio-Voice Call Continuity (SRVCC).

6. The method of claim 1, wherein the call interruption event includes one of a Real-time Transport Protocol (RTP) timeout or an SIP update failure.

7. The method of claim 1, wherein the SIP INFO message includes an instruction to execute Single Radio-Voice Call Continuity (SRVCC).

8. A User Equipment (UE) of a mobile communication system, the UE comprising:
    a transceiver configured to communicate with an external device;
    a memory electrically connected to the transceiver and configured to store information for performing communication; and
    a processor electrically connected to the transceiver and the memory, and is configured to determine whether a first waiting time related to a call interruption event in a first call mode is exceeded, transmit a Session Initiation Protocol information (SIP INFO) message for switching the first call mode to a second call mode to an external device if the first waiting time is exceeded, and switch a call mode of the UE to the second call mode based on a response message in response to the SIP INFO message,
    wherein the SIP INFO message is transmitted to the external device before a second waiting time related to the call interruption event is exceeded.

9. The UE of claim 8, wherein the first waiting time is less than the second waiting time if a session for the first call mode is established.

10. The UE of claim 8, wherein the first call mode is released if the first waiting time is exceeded.

11. The UE of claim 8, wherein the first call mode includes a Packet Switched (PS) call, and the second call mode includes a Circuit Switched (CS) call.

12. The UE of claim 11, wherein the processor is further configured to switch the call mode of the UE to the CS call according to Single Radio-Voice Call Continuity (SRVCC).

13. The UE of claim 8, wherein the call interruption event includes one of a Real-time Transport Protocol (RTP) timeout or an SIP update failure.

14. The UE of claim 8, wherein the SIP INFO message includes an instruction to execute Single Radio-Voice Call Continuity (SRVCC).

15. A chipset for controlling a User Equipment (UE) in a mobile communication system, the chipset configured to:
    determine whether a first waiting time related to a call interruption event in a first call mode is exceeded;
    transmit, if the first waiting time is exceeded, a Session Initiation Protocol information (SIP INFO) message for switching the first call mode to a second call mode to an external device; and
    switch a call mode of the UE to the second call mode based on a response message in response to the SIP INFO message,
    wherein the SIP INFO message is transmitted to the external device before a second waiting time related to the call interruption event is exceeded.

16. The chipset of claim 15, wherein the first waiting time is less than the second waiting time if a session for the first call mode is established.

17. The chipset of claim 15, wherein the first call mode is released if the first waiting time is exceeded.

18. The chipset of claim 15, wherein the SIP INFO message includes an instruction to execute Single Radio-Voice Call Continuity (SRVCC).

* * * * *